(12) United States Patent
Heinzel et al.

(10) Patent No.: US 6,490,944 B1
(45) Date of Patent: Dec. 10, 2002

(54) METHOD FOR CONTROLLING A DRIVE TRAIN OF A VEHICLE HAVING TWO POWER-SHIFT CLUTCHES

(75) Inventors: Markus Heinzel, Donzdorf (DE); Heinrich Steinhart, Aalen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/830,021
(22) PCT Filed: Jun. 27, 2000
(86) PCT No.: PCT/EP00/05939
§ 371 (c)(1), (2), (4) Date: Jun. 25, 2001
(87) PCT Pub. No.: WO01/14761
PCT Pub. Date: Mar. 1, 2001

(30) Foreign Application Priority Data

Aug. 21, 1999 (DE) .......................... 199 39 818

(51) Int. Cl.[7] .................. F16H 59/00; F16H 61/00; F16H 63/00
(52) U.S. Cl. .................. 74/335; 74/336 R; 477/169; 477/175
(58) Field of Search .................. 74/335, 336 R, 74/339; 477/169, 175, 180

(56) References Cited

U.S. PATENT DOCUMENTS

| 3,915,271 A | * | 10/1975 | Harper ................... 192/103 R |
| 5,542,887 A | * | 8/1996 | Tsukamoto et al. ........... 475/63 |
| 5,711,409 A | * | 1/1998 | Murata ..................... 192/87.11 |
| 5,722,913 A | * | 3/1998 | Gierer ......................... 477/120 |
| 5,890,392 A | * | 4/1999 | Ludanek et al. ............... 74/331 |
| 5,902,344 A | | 5/1999 | Eike et al. ..................... 701/67 |
| 5,911,648 A | * | 6/1999 | Dreibholz et al. ........... 477/148 |
| 6,117,048 A | * | 9/2000 | Toyama .................... 192/109 F |

FOREIGN PATENT DOCUMENTS

| DE | 31 40 259 | 4/1983 |
| DE | 32 18 933 | 11/1983 |
| DE | 196 52 244 | 6/1997 |
| DE | 197 81 706 | 4/1999 |
| DE | 197 51 456 | 5/1999 |

* cited by examiner

Primary Examiner—Sherry Estremsky
Assistant Examiner—Tisha D. Lewis
(74) Attorney, Agent, or Firm—Kenyon & Kenyon

(57) ABSTRACT

In a method for controlling a drive line of a vehicle, in which a power-shift clutch is engaged for torque transmission while driving, the point of engagement of a power-shift clutch that is disengaged in parallel is determined by a nonsteady-state engagement operation.

10 Claims, 2 Drawing Sheets

METHOD FOR CONTROLLING A DRIVE TRAIN OF A VEHICLE HAVING TWO POWER-SHIFT CLUTCHES

FIELD OF THE INVENTION

The present invention relates to a method for controlling a drive line provided for torque transmission between an engine and vehicle wheels of a vehicle and having two power-shift clutches arranged in parallel with one another in the power transmission path.

BACKGROUND INFORMATION

German Published Patent Application No. 196 52 244 describes methods for controlling a vehicle drive line having just one power-shift clutch. In these methods, the point of engagement of the power-shift clutch is determined while the vehicle is stationary.

The term point of engagement or kiss point is intended to mean the position of the pressure plate in which one friction face of the clutch disc makes contact with the friction face of the flywheel and the other one makes contact with the friction face of the pressure plate. That is, when the power-shift clutch is engaged, torque transmission starts from the point of engagement.

U.S. Pat. No. 5,711,409 describes methods for controlling two single-disc power-shift clutches, which are arranged in the power transmission path ahead of a so-called twin-clutch transmission of a vehicle, parallel to one another, which can be actuated in a special way and in which the two friction discs are arranged axially between two hydraulically actuable pressure plates and can be supported on an abutment plate arranged axially between them, the special feature being that the two pressure plates can be supported directly against one another via a transmission member that can be compressed resiliently in the axial direction and is arranged radially outside the friction discs, thereby making it possible to reduce or influence the respective engagement force resulting at one friction disc by the preloading force or spring force of the transmission member and by the pressure of the pressure plate associated with the other friction disc. In these methods, either a conventional process of overlapping control of the power-shift clutches or a torque-free gear-change phase are provided or a third variant, in which one power-shift clutch is engaged as soon as the other is torque-free, is provided during a gear change.

SUMMARY

It is an object of the present invention to provided a method in which the point of engagement or kiss point of the power-shift clutches may be determined while driving. This is advantageous compared with the conventional methods because the point of engagement is, inter alia, dependent on temperature and therefore shifts in the same gear during a relatively long journey without it being possible to adapt it. A knowledge of the respective point of engagement is indispensable, for example, for automatic control of a so-called twin-clutch transmission.

The method according to the present invention does not require any additional outlay on hardware but uses conventional actuators and electronic control units which are present in a conventional manner.

The method according to the present invention may be applied to power-shift clutches that open actively under the action of an actuator and to power-shift clutches that close actively under the action of an actuator.

The method according to the present invention may furthermore also be applied to power-shift clutches in which a spring arrangement, e.g., a diaphragm spring, produces a contact pressure, with the result that only 50%, for example, of the rated torque of the engine may be transmitted. To transmit a higher torque, an actuator must increase the contact pressure. To disengage a power-shift clutch of this kind, the actuator must also be able to apply a force to the diaphragm spring. A different contact pressure to be provided by the spring arrangement may also be chosen. The spring arrangement may be able to transmit, for example, between 10% and 90% of the rated torque of the engine when the actuator is not applying any contact force.

In the method according to the present invention, it is also possible to use two power-shift clutches, of which one is designed for active opening under the action of an actuator and the other is designed for active closing under the action of an actuator.

The method according to the present invention may also be applied to single- or multi-disc dry or wet clutches.

DETAILED DESCRIPTION

Figure 1:
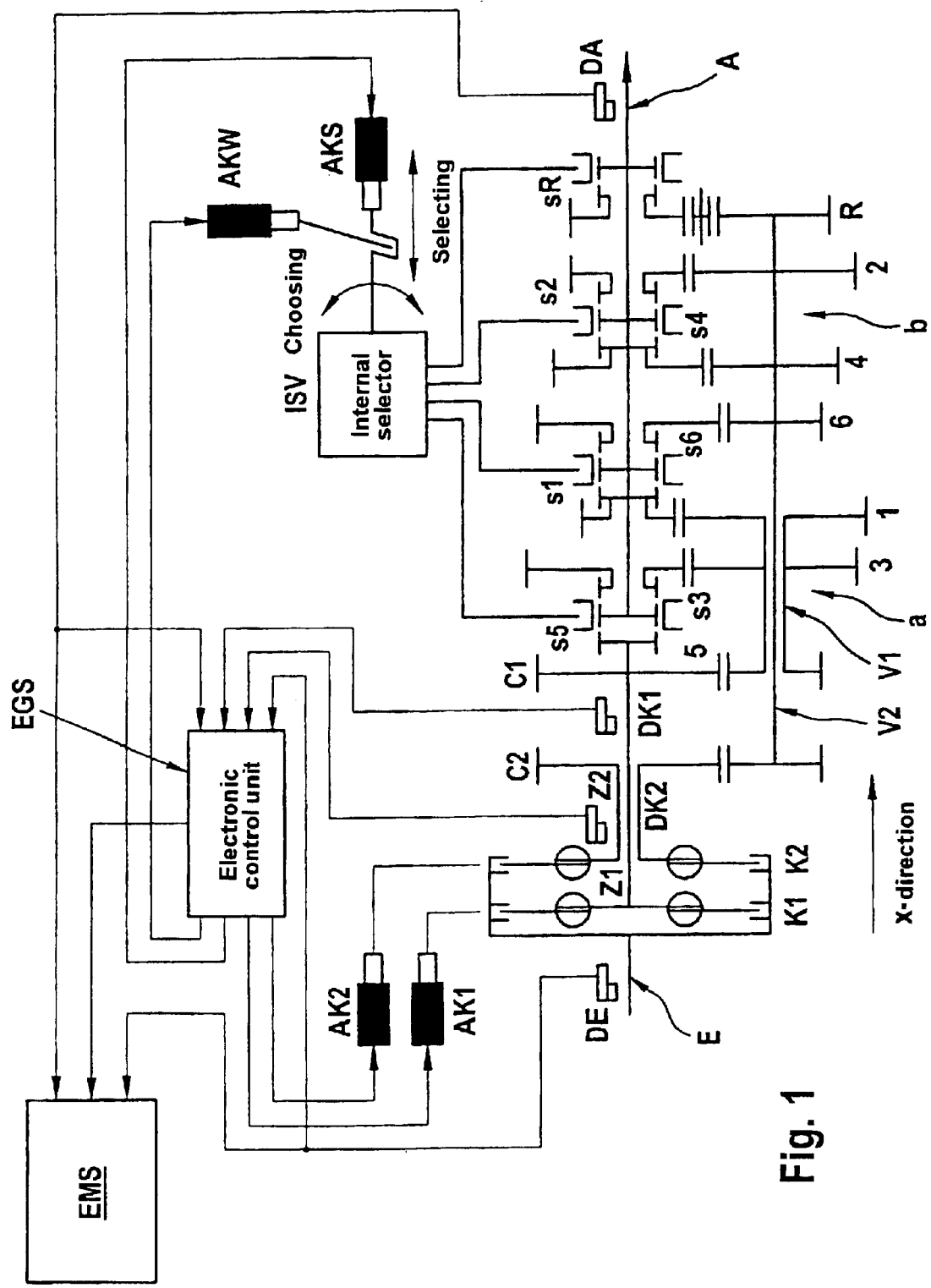
FIG. 1 is a transmission diagram of the twin-clutch transmission, which is linked to the associated actuators and control systems.

Referring to FIG. 1, a drive line for torque transmission between an engine and vehicle wheels of a vehicle includes an input shaft E that may be driven by the engine, two layshaft component transmissions a and b arranged in parallel in the power transmission path, and an output shaft A connected to the vehicle wheels in a conventional manner in terms of drive and arranged coaxially with the input shaft E.

Component transmission a includes a layshaft V1, which is configured as a hollow shaft, is parallel to the input shaft E and is connected in terms of drive to an intermediate shaft Z1 coaxial with the input shaft E by a transmission constant C1.

This intermediate shaft Z1 is connected to the input shaft E by an engageable and disengageable power-shift friction clutch K1. The layshaft V1 of component transmission a is connected to the output shaft A by a gear stage 1 associated with first gear and by a gear stage 3 associated with third gear, it being possible to couple the free gears of these gear stages 1 and 3 to the output shaft A by synchronized engageable and disengageable gearwheel clutches s1 and s3. Gearwheel clutch s3 is part of a changing clutch s3/s5, the second synchronized clutch s5 of which allows the output shaft A to be coupled to the intermediate shaft Z1 to form a direct fifth forward gear.

Component transmission b includes a layshaft V2, which passes through layshaft V1 and is connected by a transmission constant C2 to an intermediate shaft Z2 coaxial with the input shaft E. This intermediate shaft Z2, which is configured as a hollow shaft and through which intermediate shaft Z1 passes, is connected to the input shaft E by a second engageable and disengageable power-shift friction clutch K2. Layshaft V2 is connected to the output shaft A by a gear stage R associated with a reverse gear, by a gear stage 2 associated with second gear, by a gear stage 4 associated with fourth gear and by a gear stage 6 associated with sixth gear, it being possible to couple each of the free gears of these gear stages to the output shaft A by associated synchronized gearwheel clutches sR, s2, s4 and s6.

The power-shift clutches K1 and K2 are actuated by actuators AK1 and AK2 respectively, these being power-assisted, e.g., electrically, and being controlled by an electronic transmission control unit EGS that processes input signals from, inter alia, a rotational-speed sensor DE for the rotational speed of the input shaft E, a rotational-speed sensor DK1 for the secondary rotational speed of power-shift clutch K1, a rotational-speed sensor DK2 for the secondary rotational speed of power-shift clutch K2, a rotational-speed sensor DA for the rotational speed of the output shaft A and, in a manner not shown, from a choosing and selecting device that may be actuated by the driver.

The gearwheel clutches s1 ... s6, sR for selecting the six forward gears and the reverse gear are actuated by a selector device ISV within the transmission, this being actuated by an actuator AKW for choosing the gears and by an actuator AKS for selecting the gears. The actuators AKW and AKS, which are power-assisted, e.g., electrically, are controlled by the electronic transmission control unit EGS.

The instantaneous position of the actuators AK1 and AK2 and of the respective clutch halves relative to one another in the x direction indicated by an arrow in the case of the power-shift clutches K1 and K2 is detected by sensors and input into the electronic transmission control unit EGS by corresponding input signals. The respective position in the x direction of the actuators for actuating the gearwheel clutches s1 ... s6, sR is detected in a corresponding manner and input into the electronic transmission control unit EGS by associated input signals.

The rotational-speed sensor DA for the rotational speed of the output shaft A and hence for the speed of travel and, if appropriate, the electronic transmission control unit EGS are furthermore connected in a conventional manner to an electronic engine control unit EMS, which controls the power output of the engine driving the input shaft E. The electronic control units EGS and EMS may also be configured in the form of a central control unit.

In the method according to the present invention, the static state of the 2-way layshaft transmission (twin-clutch transmission) is used to detect the point of engagement of the power-shift clutches K1 and K2 while the vehicle is being driven since no gear change operation is being performed in this state and hence one of the two component transmissions a, b is always free of load and the point of engagement or kiss point of the associated power-shift clutch may then be detected in this transmission.

The method according to the present invention is explained below with reference to an example using the drive line illustrated in FIG. 1.

It is assumed that third gear is engaged and the speed of travel is significantly greater than zero. Gearwheel clutch s3 establishes a rotationally rigid connection with layshaft V1. Power-shift clutch K1 is engaged whereas power-shift clutch K2 is disengaged. Gearwheel clutches s1, s2, s4, s5 and s6 are disengaged. With power-shift clutch K2 disengaged, layshaft V2 will rotate at only a low angular velocity or will be stationary due to friction, with the result that there is a relative rotation between the clutch disc and the pressure plate. In this state, the power-shift clutch is engaged slowly by actuator AK2. At the same time, the angular velocity as a function of time is detected. If power-shift clutch K2 now reaches the kiss point, the angular velocity of layshaft V2 rises rapidly until power-shift clutch K2 changes from the slipping state to the state of static friction. From the relationship between the rise in angular velocity and the position of the actuator AK2, it is possible to deduce the kiss point.

Where the layshaft V2 of the load-free component transmission b is rotating with an angular velocity, so that the relative rotation in the disengaged power-shift clutch K2 is relatively small, this layshaft V2 may be retarded by initial synchronization with the highest gear. The term initial synchronization should be understood to mean brief actuation of the synchronized gearwheel clutch s6 without completing the selection of the associated highest gear. Following this, the kiss point may be determined as described above.

When the vehicle is stopped with the engine switched off, the position of the kiss point may be stored in a read-only memory of the electronic transmission control unit EGS, allowing the corresponding old data to be accessed when the engine is next started.

Figure 2:
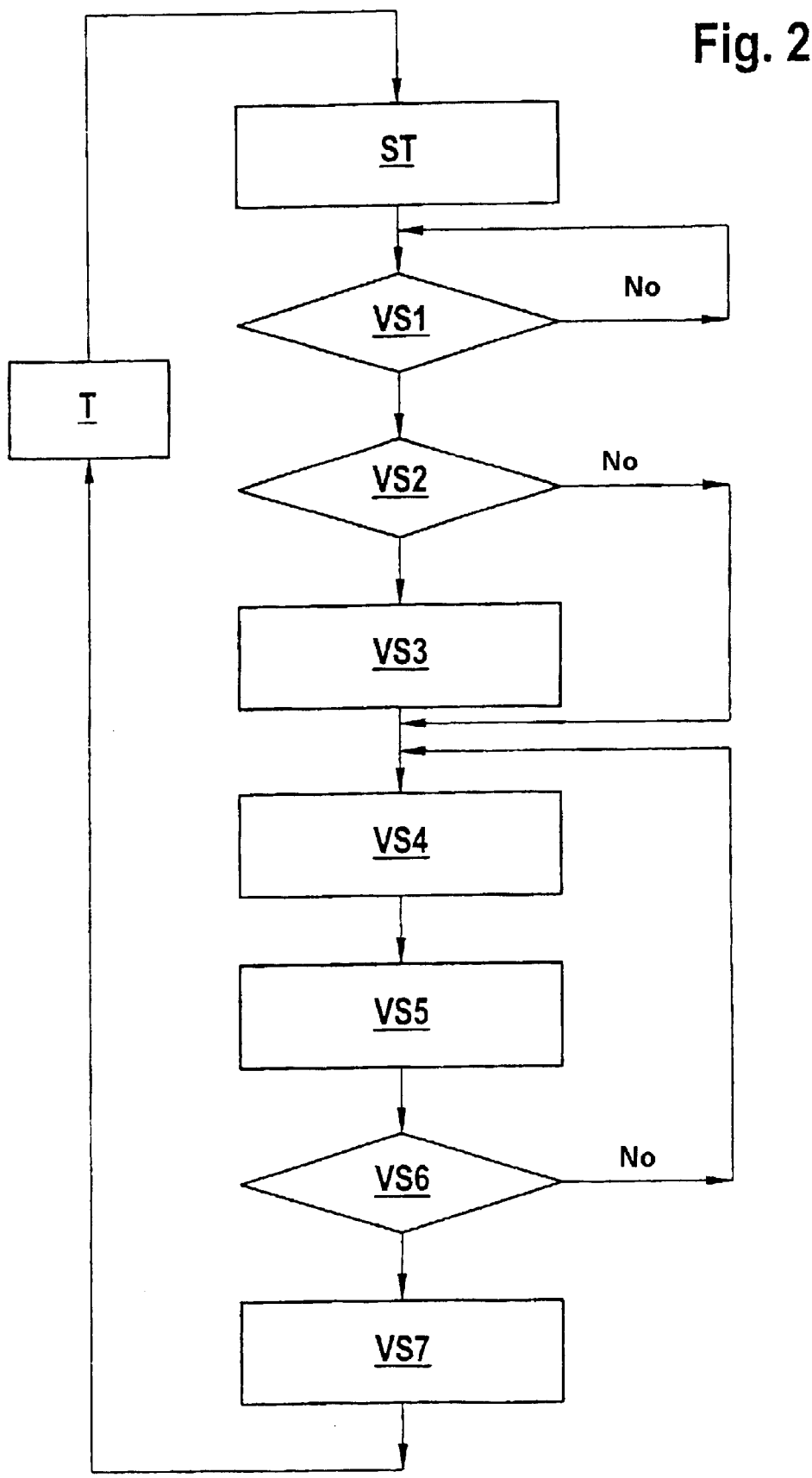
FIG. 2 illustrates a flow chart of the method according to the present invention for determining the point of engagement in one power-shift clutch of the twin-clutch transmission illustrated in FIG. 1.

The method described above for determining the point of engagement in accordance with the present invention may, for example, be performed in accordance with the signal flow diagram illustrated in FIG. 2 in the case of the power-shift clutch K1 of component transmission a in FIG. 1, as follows:

A clock generator T cyclically initiates a starting stage ST, which initiates a first method step VS1, in which the system checks whether the power-shift clutch K1 of component transmission a is disengaged in accordance with the operating mode.

If this is not the case, this checking step is repeated.

However, if power-shift clutch K1 is disengaged in accordance with the operating mode, the system checks in a subsequent method step VS2 whether one of the possible gears 1, 3 and 5 is engaged in component transmission a.

If this is not the case, the system proceeds to method step VS4.

However, if it is determined in method step VS2 that a gear is engaged in component transmission a, a third method step VS3 is triggered, in which the engaged gear of component transmission a is disengaged.

Once the gear in component transmission a has been disengaged, the system proceeds to method step VS4, in which the power-shift clutch K1 of component transmission a is engaged by a distance dx.

In a subsequent method step VS5, the instantaneous position of power-shift clutch K1 and the associated angular velocity of layshaft V1 are then stored.

In a further method step VS6, the system then checks whether power-shift clutch K1 has gone from the slipping state to the state of static friction.

If this is not the case, the system returns to method step VS4.

However, if power-shift clutch K1 has entered the state of static friction, the point of engagement is determined in a further method step VS7 from the relationship between the clutch travel x and the angular velocity of layshaft V1.

Power-shift clutch K1 may then be disengaged again and the coordinates of the point of engagement stored.

What is claimed is:

1. A method for controlling a drive line provided for torque transmission between an engine and wheels of a vehicle, comprising the steps of:

(a) engaging a first one of two power-shift friction clutches so that a speed of travel of the vehicle is unequal to zero, each power-shift friction clutch being engageable to transmit torque and disengageable to interrupt torque transmission;

(b) maintaining a second one of the two power-shift friction clutches in a disengaged load-free state, the second one of the two power-shift friction clutches being arranged in parallel with the first one of the two power-shift friction clutches;

(c) determining whether a differential speed of the second one of the two power-shift friction clutches is significantly different from zero;

(d) at least partially engaging the second one of the two power-shift friction clutches in accordance with the determining step (c); and (e) determining a point of engagement of the second one of the two power-shift friction clutches.

2. The method according to claim 1, wherein the determining step (e) is performed prior to engaging the second one of the two power-shift friction clutches, the determining step (e) including the substeps of:

(f) determining whether the differential speed of the second one of the two power-shift friction clutches is unequal to zero; and (g) setting a higher differential speed if it is determined in the determining step (f) that the differential speed is not significantly different from zero.

3. The method according to claim 1, wherein the determining step (e) includes the substep of measuring a clutch travel at a beginning of engagement.

4. The method according to claim 1, wherein the determining step (e) includes the substep of measuring a change in rotational speed of one clutch half over time.

5. The method according to claim 1, further comprising the step of storing at least one measured parameter value relating to the point of engagement in a read-only memory when the engine is switched off.

6. The method according to claim 2, wherein the setting step (g) includes the substep of reducing a rotational speed of a secondary-side clutch half.

7. The method according to claim 6, wherein the setting step (g) further includes the substep of actuating a synchronized engageable and disengageable gearwheel clutch, which is arranged in a part of the drive line configured to connect the secondary-side clutch half with the vehicle wheels, in a direction of engagement to couple a gearwheel to a respective shaft.

8. The method according to claim 7, further comprising the step of interrupting the part of the drive line before engaging the second one of the two power-shift friction clutches.

9. The method according to claim 8, wherein the interrupting step includes the substep of disengaging the gearwheel clutch.

10. The method according to claim 5, wherein the storing step is performed when the engine is turned off and when the speed of travel is equal to zero.

* * * * *

UNITED STATES PATENT AND TRADEMARK OFFICE
CERTIFICATE OF CORRECTION

PATENT NO. : 6,490,944 B1
DATED : December 10, 2002
INVENTOR(S) : Heinzel et al.

It is certified that error appears in the above-identified patent and that said Letters Patent is hereby corrected as shown below:

Title page, Item [54] and Column 1, line 1,
Change title to -- METHOD FOR CONTROLLING A DRIVE LINE OF A VEHICLE WITH TWO POWER-SHIFT CLUTCHES --.

Signed and Sealed this

Sixth Day of January, 2004

JAMES E. ROGAN
*Director of the United States Patent and Trademark Office*